United States Patent [19]

Nielsen, Jr.

[11] 4,144,729
[45] Mar. 20, 1979

[54] ELECTRIC METER BOX LOCK

[76] Inventor: Anker J. Nielsen, Jr., 410 Bailey Rd., Holden, Mass. 01520

[21] Appl. No.: 891,189

[22] Filed: Mar. 29, 1978

[51] Int. Cl.² .............................................. E05B 65/52
[52] U.S. Cl. ......................................... 70/63; 70/232; 70/371; 70/DIG. 57
[58] Field of Search ...................................... 70/32–34, 70/63, 77–78, 229, 232, 371, DIG. 57

[56] References Cited

U.S. PATENT DOCUMENTS

| 3,968,985 | 7/1976 | Nielsen | 292/340 |
| 4,006,614 | 2/1977 | Decker | 70/63 |
| 4,031,722 | 6/1977 | Michelman | 70/63 |

*Primary Examiner*—Robert L. Wolfe
*Attorney, Agent, or Firm*—Robert K. Randall

[57] ABSTRACT

This device locks the cover of an electric meter box by use of a bolt type lock which prevents access to the screw which fixes the part holding down the cover to a bracket fixed on the body of the box.

5 Claims, 8 Drawing Figures

ELECTRIC METER BOX LOCK

The present device is a heavy-duty lock for application to electric meter boxes already mounted and in service, to prevent unauthorized access to the meter works, as for the purpose of tampering with the operation of the meter or other illegitimate interference therewith.

An illustrative embodiment of the invention is shown in the accompanying drawings, in which.

Figure 1:
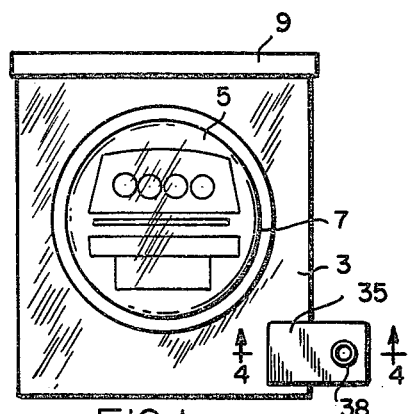
FIG. 1 is a front elevation of a meter box with the novel lock in place thereon.
Figures 2, 3:
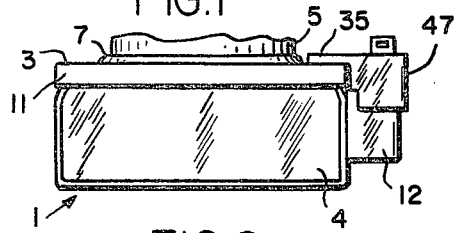
FIG. 2 is a bottom view of the same.
FIG. 3 is a side view of a portion of the box shown in FIG. 2, with the lock thereon.

Having reference to the drawings, the meter box 1 and cover 3 are shown as of the common wall-mounted type, with the recording mechanism and dials visible through a glass bowl 5 framed by the rim 7 of the cover 3. The top end of the cover underlies the flange 9 of the box and has flanges 11 on its other three edges overlying the offset margins of the vertical sides of the box and lapping under the lower side-wall 4 of the box. The usual closure means for the box is a projecting tongue on this side-wall which extends through a slot in the bend of bottom flange 11 to receive a flangible pendent seal of some sort, merely a tell-tale; it offers no resistance to entry. It is omitted as superfluous in the present case.

In accordance with the invention, a bracket 12 is affixed to the lower end-portion of one side-wall 13, as near the lower side 4 as convenient, by a screw 15 put through a back-up plate 17 and a hole 18 punched in the wall 13, and through a hole 19 through the wall of a rectangular-section tube 21 into a heavy L-section inner plate 23 fitting closely the interior of tube 21, and tapped to receive the screw 15. In addition to its tight fit in the tube 21 this L plate is fixed therein by two dents 25 swaged in opposite walls of the tube to engage the edges of the part 27, and by a rectangular plate 29 closely fitting in the tube and secured to the tube by tack welds 30 at its four corners. This part 27 of L plate 23 is drilled and tapped as shown at 31.

Figure 8:
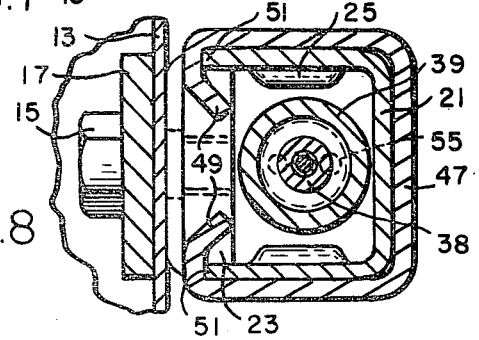
FIG. 8 is a section on line 8—8 of FIG. 4.

The detachable cover lock proper 33 which is applied to the bracket 12 comprises a heavy plate 35 with an aperture 37 in which is welded a sleeve 39 of an internal diameter to receive the head of a bolt lock 38 of the type shown in our U.S. Pat. Nos. 1923035 and 3714802. The inward end of this sleeve has a shoulder 41 through which extends the shank of a cap-screw 43 with a hexagonal socket 45. A skirt 47 is welded to one end and part of the length of the lateral edges of plate 35 to fit loosely in conforming rectangular-section telescoping relation about three sides of the tube 21 when the lock is applied, and has inturned lugs 49 which embrace the longitudinally extending edges 51 of the tube 21 at the point where one side-wall has been cut away, all as shown in FIG. 8.

An externally knurled bushing 53 is press-fitted into the bore of sleeve 39 after the screw 43 has been put through shoulder 41, — dropped in, — to constrict a portion of the bore to less than a diameter that would allow the barrel of the bolt lock to pass with its balls 55 extended.

Figure 4:
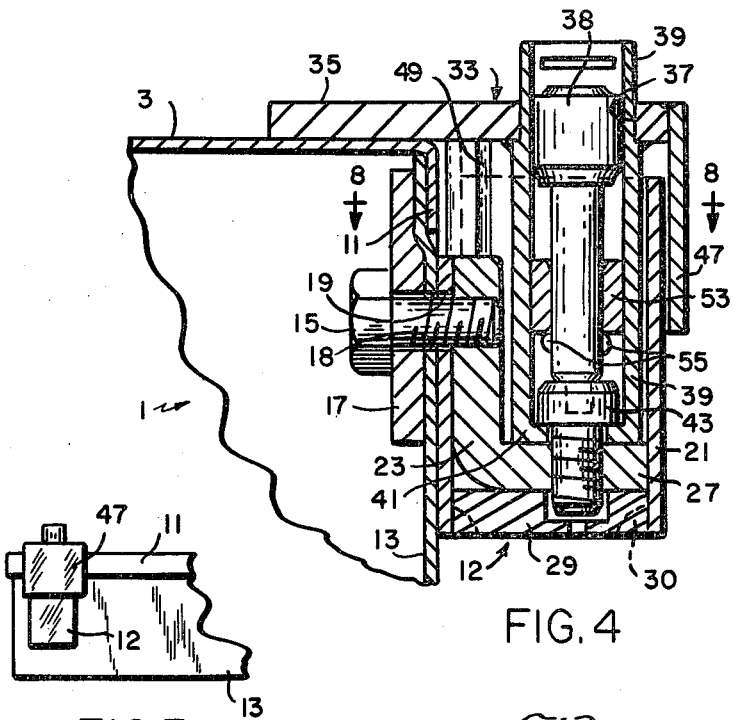
FIG. 4 is a view in enlarged horizontal section on line 4—4 of FIG. 1, with the parts in interlocked relation.
Figure 6:
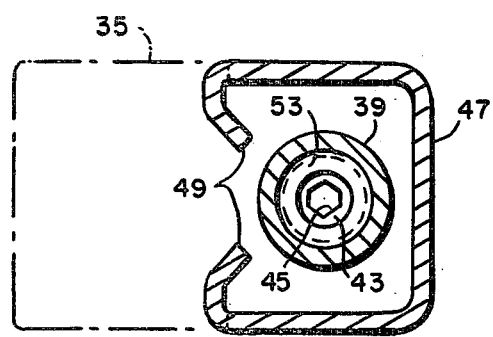
FIG. 6 is a section on line 6—6 of FIG. 5.
Figure 7:
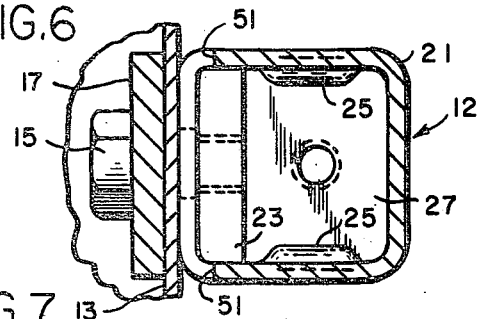
FIG. 7 is a section on line 7—7 of FIG. 5.
Figure 5:
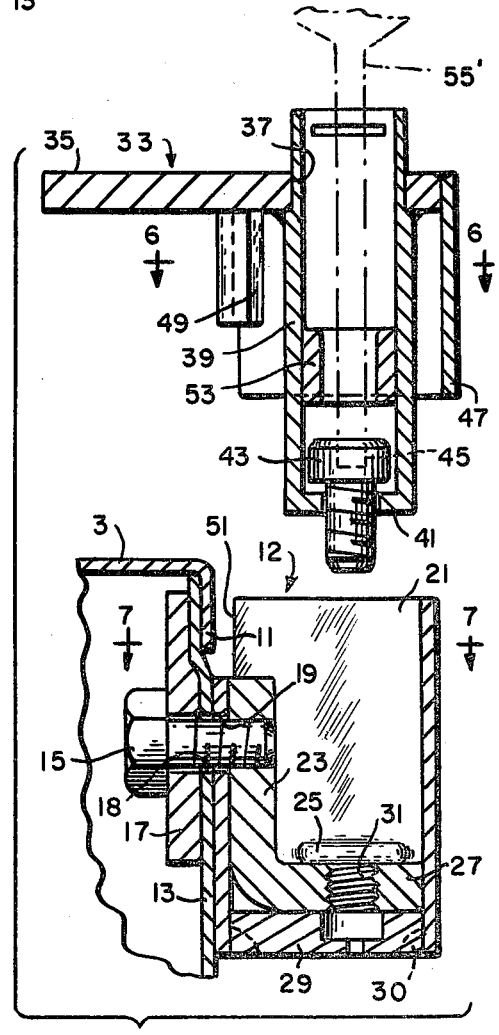
FIG. 5 shows in section on the same plane the parts of FIG. 4 in unlocked and separated relation.

With the cover lock 33 in place as shown in FIG. 4, a wrench 55, FIG. 5, with a hexagonal extremity fitting the recess 45 in screw 43 is put through the sleeve 39 and its bushing 53 to drive screw 43 home into the tapped hole 31 in plate 23 fixed to the wall 13 of the box 3 by screw 15.

Thus the cover lock 33 is fixed to the box with its plate 35 clamped down tightly and holding the cover 3 shut.

To secure the cover lock from tampering, the bolt lock 38 is put into sleeve 39 with its barrel through the bushing 53 and its locking balls 55 relaxed until they have passed the bushing, whereupon the bolt locking key (not shown) is withdrawn leaving the balls in the extended relation shown in FIG. 4 and the bolt locked in place.

Thereby the meter box is doubly locked; — the screw 43 prevents the release of the cover locking portion 33, and the bolt lock 38 prevents access to the screw 43.

All of the parts are made of very heavy steel stock and case-hardened against breakage or distortion under violent attack. The rectangular nonrotatable interengagement between the cover lock 33 and the bracket 12 prevents twisting the hold-down 35 clear of the cover. Both the mounting screw 15 and the cover-retaining screw 43 are completely shielded from attack, and no force applied to disable or pry loose the device reaches the bolt lock 38, shielded from all strain in sleeve 39. Lugs 49 hooked around the edges 51 of tube 21 aid in preventing prying off or twisting of cover lock 33 about the tube 21. The bolt lock 38 is only called on to block access to the fastening element, the screw 43, and any attack on it is ineffective.

While I have illustrated and described a certain from in which the invention may be embodied, I am aware that many modifications may be made therein by any person skilled in the art, without departing from the scope of the invention as expressed in the claims. Therefore, I do not wish to be limited to the particular form shown, or to the details of construction thereof, but What I do claim is:

1. Locking means for electric meter boxes comprising in combination a rectangular metal box to hold the meter, a cover therefor, a bracket fixed on a wall of the box having a tubular portion of angular cross-section and a closed end, a locking element including a tubular portion also of angular cross-section mating in telescoping manner with the bracket and having a portion overlying the cover, and also having a sleeve entering the tubular bracket, and means fixing the sleeve detachably to the bracket.

2. The combination according to claim 1 in which a bolt lock within the sleeve blocks access to the means fixing the sleeve detachably to the bracket.

3. The combination according to claim 2 having means in the sleeve constricting a portion of its bore to less than a diameter permitting the barrel of the bolt lock to pass therethrough with its locking elements extended.

4. The combination according to claim 1 in which the tubular portion of the locking element has inturned lugs which embrace longitudinally extending edges of the tubular portion of the bracket.

5. The combination according to claim 1 in which the means fixing the sleeve detachably to the bracket includes screw means engaging a shoulder within the sleeve and the closed end of the bracket.

* * * * *